United States Patent
Hoefs

(10) Patent No.: US 7,465,101 B2
(45) Date of Patent: Dec. 16, 2008

(54) ELECTRICAL MACHINE

(75) Inventor: Roland Hoefs, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 10/542,815

(22) PCT Filed: May 27, 2004

(86) PCT No.: PCT/DE2004/001128

§ 371 (c)(1),
(2), (4) Date: Jul. 20, 2005

(87) PCT Pub. No.: WO2004/107533

PCT Pub. Date: Dec. 9, 2004

(65) Prior Publication Data

US 2006/0062505 A1    Mar. 23, 2006

(30) Foreign Application Priority Data

May 28, 2003    (DE) ................. 103 24 621

(51) Int. Cl.
*F16C 25/06* (2006.01)
(52) U.S. Cl. .................................... 384/517
(58) Field of Classification Search ............ 384/517, 384/518, 563, 537; 267/161, 162
See application file for complete search history.

(56) References Cited

U.S. PATENT DOCUMENTS 3,951,393 A * 4/1976 Smirl ................... 267/161
5,899,574 A * 5/1999 Chujo ................... 384/518

FOREIGN PATENT DOCUMENTS

| DE | 28 07 411 | 8/1978 |
| DE | 29 39 560 A1 | 4/1981 |
| DE | 29 42 008 A1 | 4/1981 |
| DE | 198 04 328 A1 | 8/1999 |
| DE | 198 43 226 A1 | 3/2000 |
| EP | 0 164 447 A1 | 12/1985 |
| EP | 1 256 732 A1 | 11/2002 |
| GB | 2 058 955 A | 4/1981 |
| JP | 61136017 A2 | 6/1986 |

* cited by examiner

*Primary Examiner*—Thomas R Hannon
(74) *Attorney, Agent, or Firm*—Michael J. Striker

(57) ABSTRACT

An electrical machine has a rotatably supported rotor, at least one bearing for supporting the rotor in a hub, a spring element having an axially-acting spring force which acts on the bearing and also bearing against the hub with the spring force, the spring element being configured as a disc spring functionable back and forth across a flat position of the spring element, the spring element, in an outer region, bearing against an outer ring of the bearing and, in an inner region, bearing against a hub projection, the hub projection being substantially annular in shape and having a conical spring-support surface that declines outwardly in a radial direction.

6 Claims, 4 Drawing Sheets

ELECTRICAL MACHINE

CROSS-REFERENCE TO A RELATED APPLICATION

The invention described and claimed hereinbelow is also described in German Patent Application DE 103 24 621.5 filed on May 28, 2003. This German Patent Application, provides the basis for a claim of priority of invention under 35 U.S.C. 119(a)-(d).

BACKGROUND OF THE INVENTION

The present invention relates to an electrical machine, in particular a generator for motor vehicles, according to the general class of the independent claim.

An electrical machine designed as an alternator is made known in DE 198 04 328 A1, in the case of which the generator shaft is supported by a movable bearing in the hub of a housing part. A spring element inserted in the hub exerts a load on the outer ring of the movable bearing with an axial force to achieve a defined rolling motion of the rolling elements in the movable bearing and thereby attain a longer service life of the movable bearing. The design of this bearing arrangement is relatively complex, since a number of components is required to exert an axial load on the roller bearing. In addition, every single generator and its bearing point must be adjusted to a defined initial axial load using a calibration step. Moreover, with a bearing arrangement of this type, only a relatively steep increase in force in the axial direction can be achieved. Due to longitudinal vibrations of the rotor, then, a relatively steep increase in spring force results and the load on the bearing therefore increases steeply. A steep increase in the spring load and the resultant high overall axial force load on the bearing is disadvantageous, since this could result in an overload, which would greatly shorten the service life of the bearing.

SUMMARY OF THE INVENTION

Accordingly, it is an object of the present invention to provide an improved electrical machine.

In keeping with these objects, one feature of the present invention resides, briefly stated, in an electrical machine, comprising a rotatably supported rotor; at least one bearing for supporting said rotor in a hub; a spring element having an axially-acting spring force which acts on said bearing and also baring against said hub with spring force, said spring element being configured as a disk spring functionable back and forth across a flat position of said spring element, said spring element, in an outer region, bearing against an outer ring of said bearing and, in an inner region against a hub projection, said hub projection being substantially annular in shape and having a conical spring-support surface that declines outwardly.

The electrical machine according to the present invention has the advantage that a large range of spring-force characteristics with a relatively flat increase in force is attainable. This means that the spring force and, as a result, the axial force load on the bearing may increase slightly across the range of the intended compression of the spring element. As a result, the service life that can be expected of this bearing is markedly increased.

Due to the fact that the spring element, in an outer region, bears against an outer ring of a rolling bearing and, in an inner region, against a hub projection, this results—in combination with an inner ring of the movable bearing being secured in a fixed manner on a rotor shaft—in a good application of load on this movable bearing in terms of the criteria for the usual design of rolling bearings.

According to a further subclaim, it is provided that the hub projection has a basically annular shape with a conical spring-support area that declines in the outward direction. As a result of these features, the spring element bears in a defined manner in the radially inward region, which also makes it possible to leave the effective leverage of the spring force unchanged or nearly unchanged. In addition, a simple tool geometry for manufacturing this surface against which the spring element bears is made possible, thereby also extending the service life of the tool. Due to the fact that the spring element configured as a disc spring essentially has the shape of a frustoconical shell, a high axial force can be achieved, so the rolling elements in the rolling bearing roll in their races under defined conditions. This results in a favorable service life for the rolling bearing.

According to a further exemplary embodiment, it is provided that a spacer is located in the force-transfer direction between the bearing and the spring element. This spacer, as does the hub projection provided with an outwardly declining conical spring-support surface, enables positioning in the hub without causing a change in the leverage of the axially-acting spring force. The bearing is therefore able to absorb axial vibrations relatively elastically without undergoing excessive changes in force.

It can also be provided that a spacer is located in the force-transfer direction between the spring element and the hub, that fulfills the same purposes.

The spacer can be, e.g., an originally separate ring fastened to a spring element, thereby resulting overall in an economical creation of a combination of spring element and spacer.

BRIEF DESCRIPTION OF THE DRAWINGS

FIG. 7 shows a cross section through the positioning sleeve in FIG. 2a.

DESCRIPTION OF THE PREFERRED EMBODIMENTS

Figure 1:
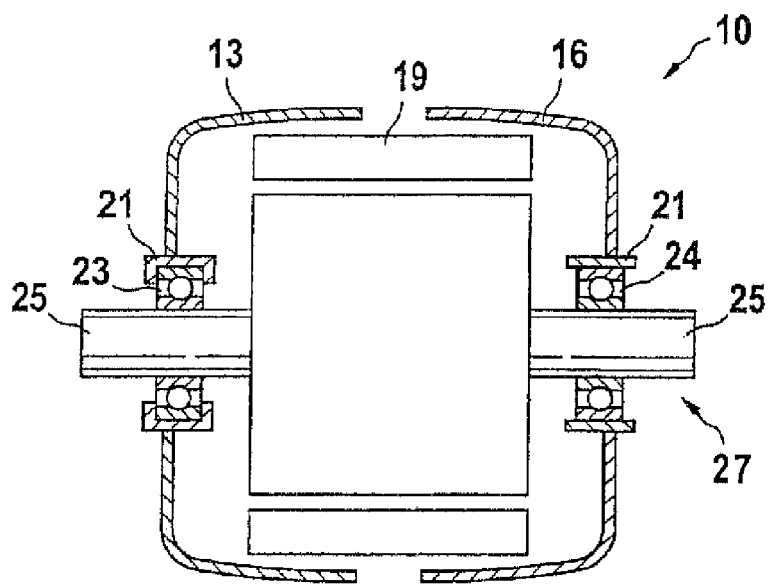
FIG. 1 shows a schematic illustration of a cross section through an electrical machine.

FIG. 1 shows, in a highly schematic view, a cross section through an electrical machine 10. Electrical machine 10 has, among other things, two housing parts 13 and 16, that accommodate, among other things, a stator 19. Housing parts 13 and 16 each have a hub 21 that serves to support shaft 25 of a rotor 27 via a bearing 23 and a bearing 24.

Left bearing 23 shown in FIG. 1 is a "fixed bearing", and bearing 24 shown in FIG. 1 is a "movable bearing". Movable bearing 24 and its configuration and position in hub 21 will be described in greater detail in conjunction with FIG. 2.

Figure 2A:
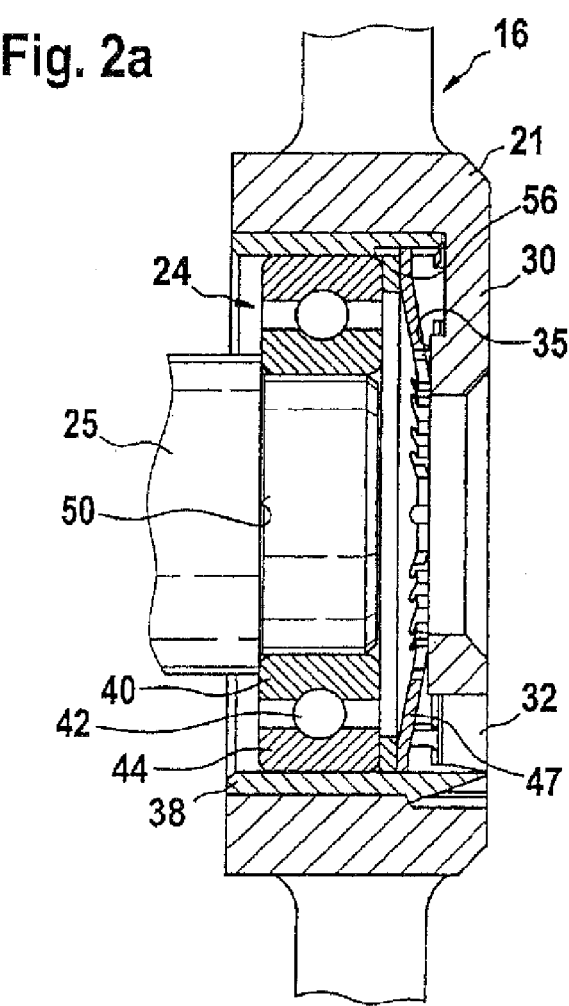
FIG. 2a shows a cross section through a bearing for supporting a rotor using a spring element.

FIG. 2a shows, in a less schematic illustration, the arrangement of right bearing 24, movable bearing in hub 21, and bearing housing part 16. Housing part 16, often also referred to as an end plate, has hub 21 in its center, the hub extending axially in the shape of a cylindrical ring. A "hub projection" 30 adjoins hub 21, the hub projection extending radially inwardly. Hub projection 30 is located on the side of hub 21 facing away from rotor 27. Hub projection 30 has a basically annular shape and is formed by a few spokes 32, among other things, oriented in the radial direction. An annular spring-support surface 35 that is part of hub projection 30 adjoins spokes 32 further radially inwardly.

A "fitting ring 38" made of plastic is inserted in hollow-cylindrical hub 21. Fitting ring 38 serves to dampen vibration excitations between hub 21 and shaft 25. Shaft 25 extends into fitting ring 38, the shaft being held in fitting ring 38 by bearing 24. In the exemplary embodiment described, bearing 24 is designed as a rolling bearing, and specifically as a roller bearing in this case. The roller bearing is essentially composed of an inner ring 40, rolling elements 42 which are spherical in this case, and outer ring 44.

An axially acting spring element 47 is inserted between bearing 24 and hub projection 30. Spring element 47 is a disc spring that has an opening in its axial center that is provided for passage of shaft 25, which has a reduced inner diameter here. Disc spring 47 essentially has the shape of a frustoconical shell and, therefore, a radially inwardly directed inner region that bears against hub projection 30 and spring-support surface 35. Spring element 47 bears against outer ring 44 of bearing 24 with a radially outwardly directed outer region. Bearing 24, in turn, rests with its inner ring 40 on a shaft shoulder 50 of shaft 25.

To enable the most economical manufacture of the electrical machine possible, it has been provided that, during construction, a relatively great tolerance between spring-support surface 35 and left housing part 13 is permissible. It is also provided that the position of shaft shoulder 50 relative to spring-support surface 35 can be very different, so that, when bearing 24 bears against spring-support surface 35 via shaft shoulder 50 and spring element 47, very different, axially acting spring forces acted between spring-support surface 35 and bearing 24 when conventional, known spring elements are used. This is not desired. Rather, a range of spring-force characteristics with a relatively flat curve of force over time in the tolerance range is provided. For this reason, it is provided that the spring element configured as disc spring functions back and forth across a "flat" position of the spring. The flat position of spring element 47 is defined to mean that the outer region of spring element 47 has the same axial position as the inner region of spring element 47. This is synonymous with a shape of spring element 47 that now exists, which is nearly a plane.

An electrical machine 10 is therefore provided, designed in particular as a generator for motor vehicles, that has a rotatably supported rotor 27, whereby at least one bearing 24 serves to support rotor 27 in hub 21, and an axially acting spring force acts on bearing 24. Spring element 47 bears against hub 21 with spring force. Spring element 47 is a disc spring and is capable of functioning back and forth across the flat position of spring element 47.

Spring element 47 bears, in an outer region, against outer ring 44 of bearing 24 configured as a rolling bearing and, in an inner region, against a hub projection 30.

Figure 2B:
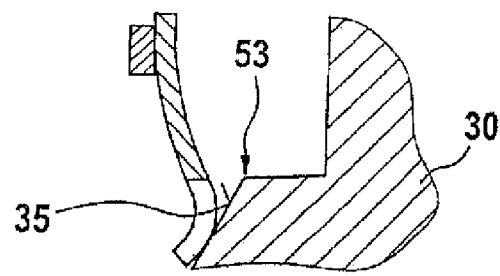
FIG. 2b shows an enlarged depiction of a section of the hub projection.

Hub projection 30 and spring-support surface 35 are shown in an enlarged depiction in FIG. 2b. To better show the shape of spring-support surface 35, it was shown in this highly exaggerated illustration unequivocally as an outwardly declining, conical spring-support surface 35. The purpose of this highly conical spring-support surface 35 is to prevent an over-proportionally great increase in spring force between hub projection 30 and outer ring 44 during the axial vibrations of rotor 27. It is provided that, in the extreme position of spring element 47, i.e., in a particularly highly deflected position of spring element 47 in the direction toward hub projection 30, spring element 47 does not come to rest against a radially inwardly lying edge 53 of spring-support surface 35. If spring element 47 were deflected to this extent, this would mean the spring force would no longer bear against the radially outwardly directed side of spring-support surface 35, but directly against edge 53, for example. As a result, the spring force between outer ring 44 and hub projection 30 would increase abruptly and bearing 24 or spring element 47 might therefore be overloaded.

For the same reason, it is provided, among other things, in the exemplary embodiment according to FIG. 2a that, between outer ring 44 and the actual spring part of spring element 47, an annular spacer 56 is secured between the outer region of spring element 47 and outer ring 44. Without this spacer 56, spring element 47 could bear, in a position in which it is pressed through to hub projection 30, against an edge of the bore of inner ring 40. This would result in a reduction of the effective leverage of the axial force here as well and, as a result, the spring force would increase abruptly. To this end, spacer 56 is provided with conicity. Spacer 56 essentially has the shape of a frustoconical shell, the larger opening of which is directed toward spring element 47. The conicity is, e.g., 7° (the cone angle is therefore 14°). Spacer 56 therefore bears radially outwardly with a substantially narrow, circular ring-shaped surface against spring element 47 and can also be connected with spring element 47 via this circular ring-shaped surface or be secured to it, e.g., using an integrally joining connection technique, such as welding, soldering or adhesive bonding. With this design, spacer 56 avoids a shortening of the effective leverage in the region of the transition from spring element 47 to spacer 56, which would occur with a flat spacer 56 and a simultaneously greatly deflected spring element 47. Otherwise, spring element 47 would bear against the radially inwardly located edge of spacer 56 directed toward spring element 47, resulting in an increased load on the spring element. A further reason for spacer 56 is that, due to spacer 56, it can be ruled out that spring element 47 would bear against inner ring 40 in the loaded and deflected state of spring element 47. Otherwise, there would be a risk that it would wear through. A spacer 56 is therefore located in the force-transfer direction between bearing 24 and spring element 47.

Figure 3A:
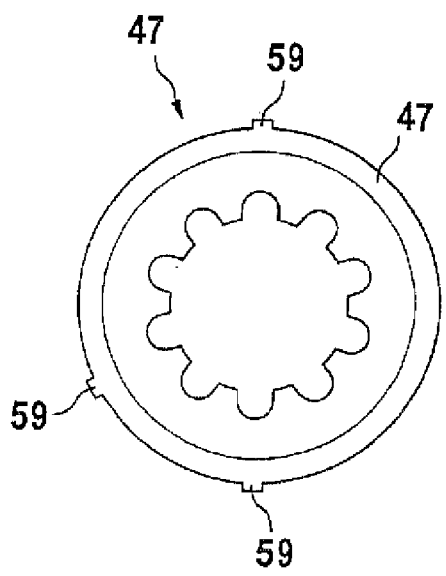
FIGS. 3a and 3b show two views of the spring element in FIG. 2a, FIGS. 4a and 4b show, in a highly schematic view, the behavior of the spring element in FIG. 3a and FIG. 3b when loaded by axial vibrations of the rotor.
Figure 3B:
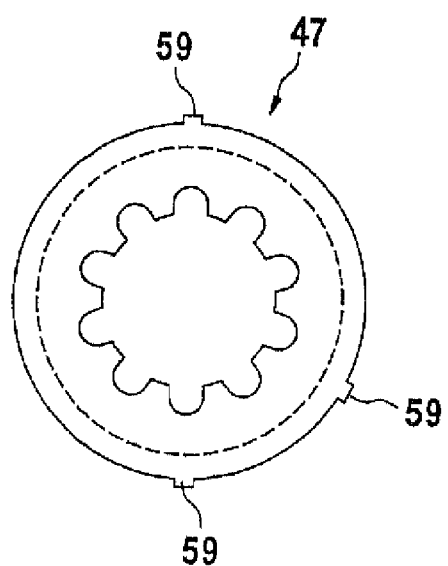

A view of spring element 47 from the left is shown in FIG. 3a, based on FIG. 2a. The view of spring element 47 shown in FIG. 3b is a view from the right. The annular shape of spacer 56 and spring element 47 is clearly recognizable. Spring element 47 has an overall wave-shaped inner region. In this example, a total of three pegs 59 are formed on the outer edge of spacer 56, the function of which will be explained below in conjunction with FIG. 7. The number of pegs 59 can also deviate from this; for instance, four or six pegs are also possible.

Figure 4A:
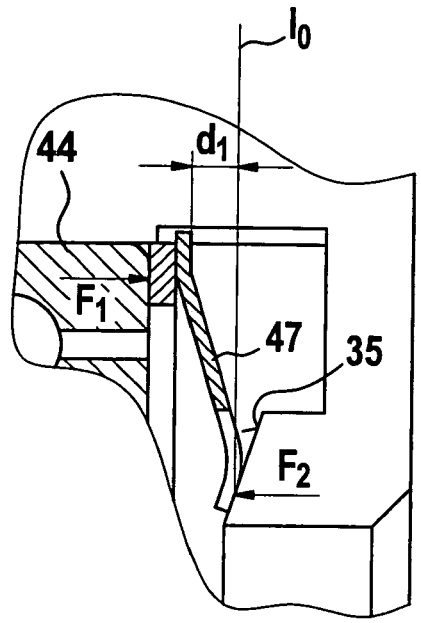
Figure 4B:
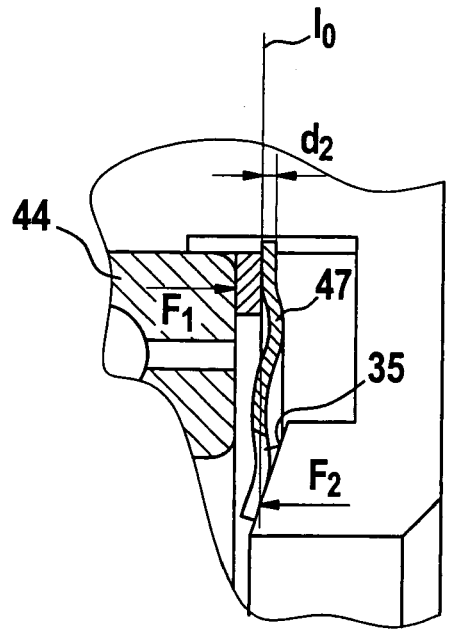

A schematic view of spring element 47 is shown in FIG. 4a and FIG. 4b. In both cases, the axial deflections of spring element 47 are shown in a greatly exaggerated manner to clearly illustrate the changes. FIG. 4a illustrates the force and position relationships of a first operating state, in which a supporting force $F_2$ between spring-support surface 35 and spring element 47 acts on the radially inner side of spring element 47. An equal force $F_1$ acts between outer ring 44 and, in this case, spacer 56. Line $l_0$ was selected as the reference line, which, in this case, lies in the plane of osculation between spring element 47 and spring-support surface 35. The axial height of spring element 47 between the side of spring element 47 facing hub projection 30 and the plane of osculation is $d_1$. The further extreme case in FIG. 4b shows a spring element 47 deflected fully to the right past the flat position, whereby the side of spring element 47 facing hub projection 30—the contact surface between outer ring 44 and spacer 56—is now on the other side of flat position $l_0$, i.e., $d_2$. It is also clearly shown that force $F_2$, which is now acting between outer ring 44 and spring element 47, and between spring element 47 and spring-support surface 35 is nearly as great as force $F_1$ that was applied previously.

Figure 5A:
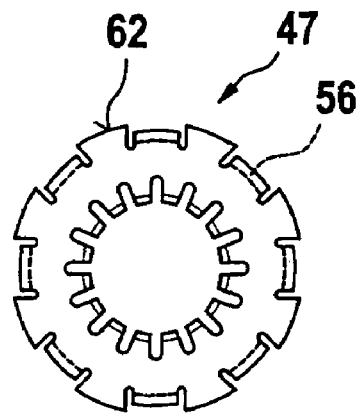
FIGS. 5a, 5b, and 5c show three different views of a second exemplary embodiment of a spring element.
Figure 5B:
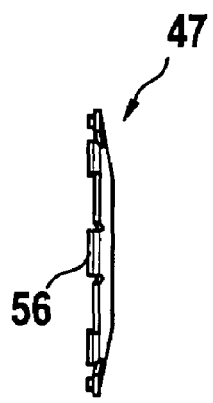
Figure 5C:
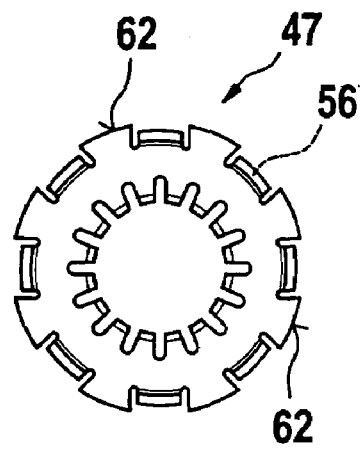

A further exemplary embodiment of a spring element 47 is shown in three different views in FIG. 5a, FIG. 5b and FIG. 5c. Similar to FIG. 3a, the illustration in FIG. 5a is also a view from the left; accordingly, the view in FIG. 5c is a view from the right, similar to the illustration in FIG. 3b. As is the case with the exemplary embodiment of spring element 47 described above, this exemplary embodiment also has a radial inner region that has a generally wave-shaped configuration. The outer region of spring element 47 is slotted in close intervals and has alternating radial positioning elements 62 that serve to concentrically position spring element 47 in the fitting ring 38 and, therefore, to concentrically position the rotor axis. As an alternative, indirect concentric positioning can take place between spring element 47 and hub 21. Spacers 56 are located between the positioning elements, which bear against outer ring 44, as they do in the previous exemplary embodiments. Overall, these spacers 56 are curved and are U-bent at a nearly right angle.

Figure 6:
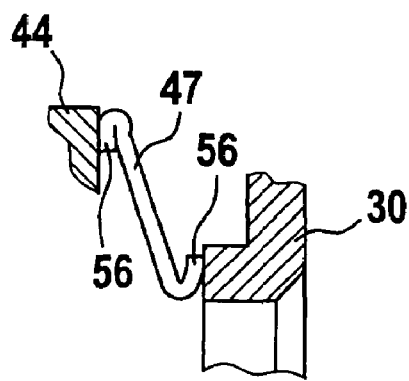
FIG. 6 shows a third exemplary embodiment of a spring element.
Figure 7:
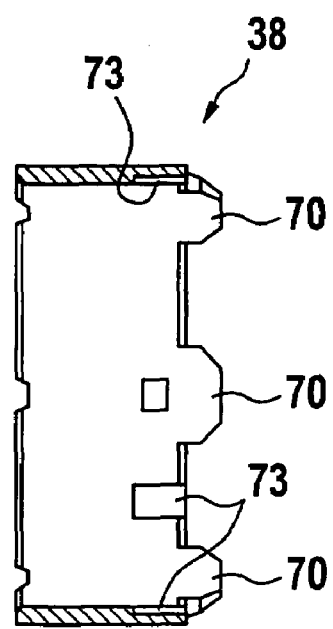

FIG. 6 shows a third exemplary embodiment of a spring element 47. It is provided that spring element 47 and spacer 56 for outer ring 44 are configured as a single component. In addition, but which can also be used individually, a further spacer 56 is located in the force-transfer direction between spring element 47 and hub 21, which is also integrally joined as a single component in this case. Finally, a sectional view of fitting ring 38 is shown in FIG. 7. Fitting ring 38 has insertion pegs 70 on one axial end, which are pressed between spokes 32 of housing part 16 and, in addition, as also shown in FIG. 2a, are configured as snap-in elements and engage in grooves between spokes 32. Sections between pegs 70 also interact with spokes 32 such that spokes 32 acts as stops for fitting ring 38. Pegs 70 limit the play of fitting ring 38 in the axial direction toward the left, and the intermediate spaces between pegs 70 limit play toward the right, thereby resulting, overall, in a defined position of fitting ring 38 in hub 21. In addition, three grooves 73 are formed on the cylindrical inner circumference of fitting ring 38, into which pegs 59, mentioned above (refer also to FIGS. 3a and 3b) are inserted, thereby resulting in an overall unequivocal position of spring element 47, according to the exemplary embodiment in FIGS. 2a, 3a and 3b, in fitting ring 38. An incorrect position of spring element 47 in hub 21 is thereby ruled out. For the case in which an unequivocal match between spring element 47 and hub 21 is not required, pegs 59 and grooves 73 can also be distributed evenly around the circumference.

What is claimed is:

1. An electrical machine, comprising a rotatably supported rotor; at least one bearing for supporting said rotor in a hub; a spring element having an axially-acting spring force which acts on said bearing and also bearing against said hub with the spring force, said spring element being configured as a disc spring functionable back and forth across a flat position of said spring element, said spring element, in an outer region, bearing against an outer ring of said bearing and, in an inner region, bearing against a hub projection, said hub projection being substantially annular in shape and having a conical spring-support surface that declines outwardly in a radial direction.

2. An electrical machine as defined in claim 1, wherein said spring element configured as a disc spring substantially has a shape of a frustroconical shell.

3. An electrical machine as defined in claim 1; and further comprising a spacer located in a force-transfer direction between said bearing and said spring element.

4. An electrical machine as defined in claim 3, wherein said spacer is configured as a ring secured to said spring element.

5. An electrical machine as defined in claim 1; and further comprising a spacer located in a force-transfer direction between said spring element and said hub.

6. An electrical machine as defined in claim 5, wherein said spacer is configured as a ring secured to said spring element.

\* \* \* \* \*